United States Patent Office 3,427,317
Patented Feb. 11, 1969

3,427,317
CERTAIN PSEUDO OXATRIAZOLE DERIVATIVES
Lemont B. Kier, Worthington, Ohio, and John W. Keating, Rochester, N.Y., assignors to Wallace & Tiernan Inc., East Orange, N.J., a corporation of Delaware
No Drawing. Original application Apr. 23, 1963, Ser. No. 274,906. Divided and this application Apr. 27, 1966, Ser. No. 545,541
U.S. Cl. 260—292    10 Claims
Int. Cl. C07d 85/06; A61k 27/00

ABSTRACT OF THE DISCLOSURE

A pseudo-oxatriazole having the formula

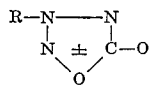

wherein R is an alkyl, cycloalkyl, aralkyl, alkoxyalkyl, alkaryl, alkarylalkyl, alkoxyaryl, and unsaturated alkyl (alkenyl) amino-alkyl, or heterocyclic group. The heterocyclic group includes such members as pyridyl, piperidyl, tropanyl, and pseudo-oxatriazole alkyl. The above compounds are obtained by heating a N-nitrososemicarbazide having the formula:

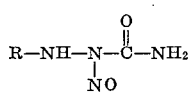

wherein R has the same meaning as R above, at a temperature and for a time such as to bring out cyclization.

The above pseudo-oxatriazole compounds are physiologically absorbed at an extremely fast rate. The cycloalkyl pseudo-oxatriazoles are particularly useful as central nervous system stimulants, and the aralkyl and alkyl pseudo-oxatriazoles as hypotensive agents.

---

This application is a division of our copending application Ser. No. 274,906, filed Apr. 23, 1963, now abandoned.

The invention relates to pseudo-oxatriazoles, sometimes designated as ψ-oxatriazoles, and to their use as therapeutic agents.

An object of the invention is to provide therapeutic products and treatments wherein the product used has superior physiological absorption characteristics over other therapeutic products used for the same purpose.

Another object is to provide compounds useful as intermediates in the production of quickly absorbable compounds from compounds which are slowly absorbable.

Another object is to provide compounds and compositions useful for lowering blood pressure.

Another object is to provide improvements in the treatment of hypertension.

A further object is to provide compounds and compositions useful as central nervous system stimulants.

We have discovered that the pseudo-oxatriazoles in general are physiologically absorbed at an extremely fast rate and that the response of an animal to an oral dose of a pseudo-oxatriazole is nearly as immediate as that obtained from an intravenous dose.

For example the speeds of absorption from the gastric intestinal tract of the pseudo-oxatriazoles tested by us, including isopropyl pseudo-oxatriazole, and cyclohexyl pseudo-oxatriazole, as shown by the time of onset of effect, are of the order of 30–90 seconds as compared to 30–90 minutes for most drugs, on the basis of a significant number of rats, cats, and dogs.

We also found that the pseudo-oxatriazoles are absorbed from the stomach itself in 30–90 seconds, whereas most other drugs show little or no absorption through the walls of the stomach.

This high physiological absorption rate of the pseudo-oxatriazoles makes the pseudo-oxatriazole as a class useful for many purposes, including their use as intermediates in medical research wherein the pseudo-oxatriazole is combined with a poorly absorbable therapeutic agent to introduce the pseudo-oxatriazole group so as to make the combination a more readily absorbable therapeutic agent.

The novel and useful pseudo-oxatriazoles of this invention have the formula:

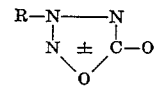

wherein R is an aralkyl, alkoxyalkyl, alkaryl, alkarylalkyl, alkoxyaryl, and unsaturated alkyl (alkenyl) aminoalkyl, or heterocyclic group. The heterocyclic group includes such members as pyridyl, piperidyl, tropanyl, and pseudo-oxatriazole alkyl. The above compounds are obtained by heating a N-nitrososemicarbazide having the formula:

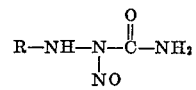

wherein R has the same meaning as R above, at a temperature and for a time such as to bring out cyclization. A suitable temperature is about 50° C. for about one-half hour, temperatures slightly above normal room temperature may be used. Higher temperatures such as 100° C. may be used with some decomposition products being obtained and consequent lower yields.

It will be noticed that the pseudo-oxatriazole ring structure as given above has only one position wherein substitution is possible. This structure is taken to represent all compounds referred to herein regardless of the substitution group.

Simplified nomenclature is employed where possible for convenience and because of the considerable disagreement recorded in the literature concerning structure. In this connection note the summary of A. R. Katritzky in Chemistry and Industry, 1955, 521. Such simplified nomenclature is employed to advantage in the discussion and the listing of compounds in the several paragraphs below. One will note, however, that compounds given in the examples are named according to preferred indexing entry of Chemical Abstracts.

We have found that the aryl substituted alkyl (aralkyl) pseudo-oxatriazoles are vasodepressors and lower the blood pressure in normal and in hypertensive animals. They are useful as hypotensive agents. Suitable compounds of this class include 3-phenethyl pseudo-1,2,3,4-oxatriazole-5-one, 3-benzyl pseudo-1,2,3,4-oxatriazole-5-one, and 3-(alpha-methylphenethyl)-pseudo-1,2,3,4-oxatriazole-5-one.

The cyclo-alkyl pseudo-oxatriazoles, namely compounds of the above formula where R is a cyclo-alkyl, are this class include cyclohexyl pseudo-oxatriazoles and cyclopentyl pseudo-oxatriazoles.

The alkyl pseudo-oxatriazoles are vasodepressants or hypotensive agents and they also have some central nervous system stimulating effects, although this is less than for the cyclo-alkyl compounds. These alkyl pseudo-oxatriazoles include 2-ethylhexyl pseudo-oxatriazole, hexyl-2-pseudo-oxatriazole, butyl-pseudo-oxatriazole, and methyl-pseudo-oxatriazole.

Other pseudo-oxatriazole compounds readily prepared in accordance with this invention, and which are highly absorbable and also useful as intermediates, are as follows:

3-(2,3, or 4-pyridyl)-pseudo-1,2,3,4-oxatriazole-5-one,
3-(3,3-dimethyl-2-butyl)-pseudo-1,2,3,4-oxatriazol-5-one,
3-(2-ethoxyethyl)-pseudo-1,2,3,4-oxatriazol-5-one,
pseudo-1,2,3,4-oxatriazol-5-one,
3-allylpseudo-1,2,3,4-oxatriazol-5-one,
3-(pent-4-enyl)-pseudo-1,2,3,4-oxatriazol-5-one,
bispseudo-1,2,3,4-oxatriazol-5-one where R is tetramethylene attached to a pseudo-oxatriazol-5-one,
bispseudo-oxatriazol where R is hexamethylene attached to a pseudo-oxatriazol-5-one,
3-furfuryl pseudo-1,2,3,4-oxatriazol-5-one,
3-phenyl pseudo-1,2,3,4-oxatriazol-5-one,
3-(o-methoxyphenyl)-pseudo-1,2,3,4-oxatriazol-5-one,
3-tolylpseudo-1,2,3,4-oxatriazol-5-one,
3-(dimethylamino-2-butyl) pseudo-1,2,3,4-oxatriazol-5-one, and
3-(3-dimethylamino-1-methylpropyl)-pseudo-1,2,3,4-oxatriazol-5-one.

A typical synthesis is shown below.

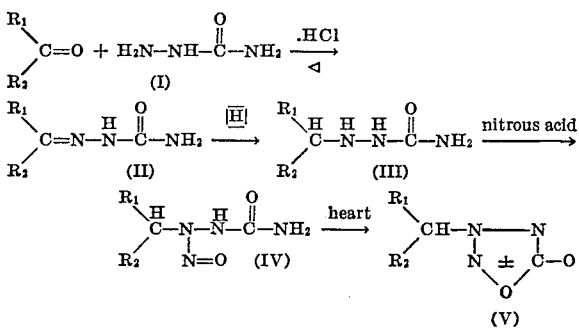

where $R_1$ and $R_2$ are the same or different organic radicals.

In the above reaction the starting material is a ketone reacted with a semicarbazone. An aldehyde may be used in place of the ketone whereby the final pseudo-oxatriazole is

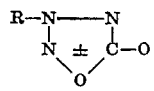

A synthesis showing the production of an aryl pseudo-oxatriazole is as follows:

A solution of 2 g. of phenylazotrinitromethane in 10 cc. of glacial acetic acid was heated on a water bath at 50° C. for a short time of about 20 minutes. The acetic acid was then evaporated and the residue allowed to stand in water for several days. The residue from filtration of this solution was then recrystallized from alcohol to give crystals, M.P. 85° C., of phenyl pseudo-oxatriazole in about 10 percent yield.

The following examples are given to illustrate the invention:

EXAMPLE I

Preparation and testing of isopropyl pseudo-oxatriazole (Preferred chemical abstracts nomenclature: 3-isopropyl-pseudo-1,2,3,4-oxatriazol-5-one)

232 g. of acetone was mixed with 472 g. of semicarbazide hydrochloride having the formula $$NH_2-NH-CO-NH_2 \cdot HCl$$

in a solution of 720 g. of sodium acetate in 2 liters of water. The mixture was heated to 80° C. for 2 hours and there was produced 360 g. of a semicarbazone having the formula

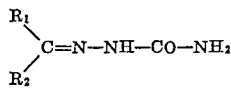

This compound was reduced with hydrogen and platinum to form 80 g. of a composition having a melting point of 124 to 125° C. corresponding to the compound No. III of the previous equations having the formula

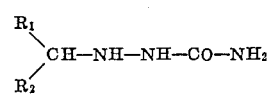

This was added to 175 ml. of water and 179 ml. of concentrated HCl and cooled to 0° C., after which was added dropwise 900 ml. of 10% sodium nitrate, the temperature being maintained to 0 to 5° C. over a period of 2 hours. The composition was then brought to room temperature (20° C.) and extracted with ether. The ether was washed with half volume of diluted ammonium hydroxide then washed to neutrality with water. The ether was dried and distilled. There was obtained 55 g. of crude isopropyl pseudo-oxatriazole having a boiling range of 62° to 78° C. at 1.4 mg. pressure of mercury. This was redistilled. The fraction boiling between 62° to 64° C. at 1.4 mg. pressure yielded 32.0 g. of isopropyl pseudo-oxatriazole. This had a refraction index of 1.4590 at 25° C. The structure was confirmed by elemental analysis, also by ultraviolet and infrared spectroscopy.

Test: The isopropyl pseudo-oxatriazole obtained above was tested on 25 mice, 40 rats, 5 cats, and 5 dogs. In all cases absorption following oral administration of the compound in doses ranging from 10 mg. to 1000 mg. per kilogram of body weight was essentially complete within 90 seconds. The blood pressure response was observed immediately after administration of the compound and paralleled observation made when the compound was administered peritoneally (subcutaneously, intravenously, and intraperitoneally). The compound materially reduced the blood pressure in both the normal and hypertensive animal. The blood pressure was reduced from 25% up to 60% of the pretreatment level and the hypotension persisted for a period of 90 minutes to 4 hours following administration of the compound.

EXAMPLE II

Preparation and testing of cyclohexyl pseudo-oxatriazole (A) Cyclohexylsemicarbazide.—Cyclohexylsemicarbazone (40.0 gms.) was dissolved in glacial acetic acid (200 ml.) and reduced with gaseous hydrogen at 50 p.s.i. using prereduced platinum oxide as a catalyst. Upon completion of the reduction (10 hrs.), the solution was filtered to remove the catalyst and made basic with 10% aqueous sodium hydroxide. The precipitate which separated upon basification weighed 35 grams. M.P. 182–184° C.

(B) Cyclohexyl-pseudo-oxatriazole.—Alternative name preferred by chemical abstracts, 3-cyclohexyl-pseudo-1,2,3,4-oxatriazol-5-one.

A slurry of 35 grams (0.22 mole) of cyclohexyl semicarbazide in a mixture of 100 ml. of concentrated hydrochloric acid and 200 ml. of water is chilled to and maintained at 0° C. Dropwise a solution of sodium nitrite (40.0 gms., 0.58 mole) in 30 ml. of water is added with vigorous stirring. After the completion of the addition, the solution is warmed gently to 60° by a water bath. When the evolution of gas is completed, the separated product is collected by filtration. Yield 30.0 gms., M.P. 72–73° C.

The material was successively recrystallized from three solvent mixtures:

(1) Ethanol-water
(2) Benzene-petroleum ether
(3) Methanol-water

The melting point remained at 72.5–73.5° C. after the second recrystallization.

*Analysis.*—Calculated for $C_7H_{11}N_3O_2$: C, 49.69; H, 6.55; N, 24.84. Found: C, 49.82; H, 6.77; N, 24.90.

EXAMPLE III

Preparation of 3-(4-dimethylaminobut-2 yl) pseudo-1,2,3,4-oxatriazol-5-one

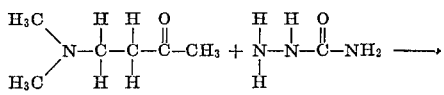

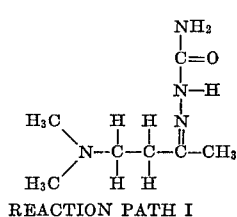

REACTION PATH II        REACTION PATH I $H_2/PtO_2$ ↓            ↓ $H_2/PtO_2$

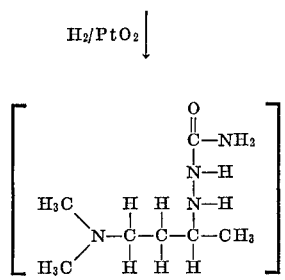    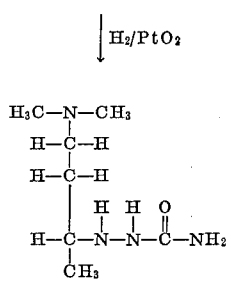

NaNO₂, HCe [Heat] ↓      ↓ NaNO₂, H₂SO₄

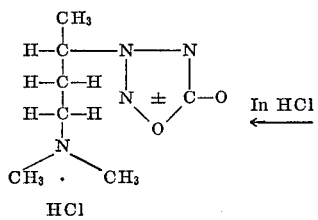    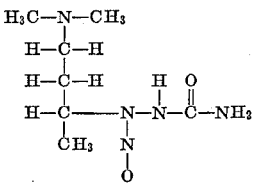

 In HCl ←

Details of the experimental procedure, shown in the above flow diagram, follow:

EXPERIMENTAL (1) 4-dimethylamino-2-butanone 160 g. (2.0 M) of dimethylamine hydrochloride, 200 g. (2.2 m.) of 33% formaldehyde and 580 gm. (10.0 m.) of acetone were refluxed for 12 hours. The lower layer of the reaction mixture was separated and evaporated in vacuo. The residue was rendered alkaline with a sodium carbonate solution followed by an excess of 50% sodium hydroxide with cooling. An oil separates and was extracted with ether. The dried ethereal solution was evaporated and the product distilled at 49–54°—12 mm. Yield 84.2 gms. 39%.

(2) Semicarbazone of 4-dimethylamino-2-butanone 11.5 g. (0.1 m.) of 4-dimethylamino-2-butanone, 11.1 g. (0.1 m.) of semicarbazide hydrochloride, 13.6 g. of sodium acetate crystal and 100 cc. of 50% methanol was shaken (or stirred) for 4 hours at room temperature. After heating for a short time (10 min.) at 40–50° C., the clear solution was evaporated to dryness in vacuo. The residue was then dissolved in minimum amount of water and then basified with an excess saturated solution of potassium carbonate. An oil separated and a small of the product ensued after leaving the mixture in the cold. The product was filtered and washed with hexane. After drying in vacuo at 70° C. the product melted at 96–99° C. After several recrystallizations from acetonitrile or hexane the final melting point was observed at 106–107° C. Yield 6 gms. 35%.

amount of ether was added to the mixture. Crystallization

REACTION PATH I

Semicarbazide of 4-dimethylamino-2-butanone 17.4 g. (0.1 m.) of the semicarbazone was dissolved in 18 cc. (0.2 m.) of concentrated hydrochloric acid and 100 cc. of methanol and reduced with hydrogen at 50 p.s.i. using prereduced platinum oxide (200 mg.). The theoretical amount of hydrogen was taken up in 16 hours using a low pressure Parr-bomb shaker. The reaction mixture was filtered to remove the catalyst and the filtrate was basified with solid sodium bicarbonate to pH 8. The reaction mixture was evaporated to dryness in vacuo. The crude solid melted at 160–170° C. The while solid was then treated with a saturated solution of potassium carbonate rendering it strongly basic. An oil separated and when 100 cc. of ether was added, the oil crystallized when triturated. The mixture was filtered and the product was again triturated with ether. Yield 6 g. M.P. 93–95° C.

Results obtained from the following characterization tests performed upon the semicarbazone and its reduction product, the substituted semicarbazide:

|  | 5% Phosphomolybdic Acid | Fehling's | Tollen's |
| --- | --- | --- | --- |
| (1) Substituted semicarbazide | Positive (blue) | Positive (red precipitate) | Positive (silver mirror) |
| (2) Semicarbazone | Negative | Negative | Negative |

1-(4-dimethylaminobut-2-yl)-1-nitroso semicarbazide or 1-[2-(4-dimethylaminobutyl)]-1-nitroso semicarbazide 4 g. (.023 m.) of the substituted semicarbazide prepared in the previous section was dissolved in anhydrous methyl alcohol and cooled to 0° C. Nitrous acid fumes (produced by the action of 25% sulfuric acid on sodium nitrite in a nitrogen atmosphere) were bubbled slowly in the solution while maintaining the temperature between 0°-5° C. Nitrogen gas helped sweep the fumes into the reaction mixture. The product was filtered and the dried white product weighed 2.5 g. M.P. 134–135°. An additional .5 g. of the title compound was obtained by the evaporation of the alcoholic filtrate. M.P. 127–130°. Total yield 3 g. 70%.

Results of the following characterization tests:

Greiss nitroso test—positive.
Liebermann nitroso test—positive.
Phosphomolybdic test for active hydrogen—negative.

3(4-dimethylaminobut-2-yl)pseudo-1,2,3,4-oxatriazole-5-one

One half gram (.002 m.) of the nitroso semicarbazide was dissolved in 25 cc. of concentrated hydrochloric acid and warmed gently in a water bath maintaining the temperature of the bath at 65° C. When the gases ceased to evolve from the reaction mixture, the clear solution was cooled and neutralized with a 10% sodium hydroxide solution. The solution was evaporated to dryness in vacuo and the solid residue was extracted with hot isopropyl alcohol. (2×50 cc.). The combined isopropyl alcohol extracts were evaporated to dryness in vacuo and the viscous residue was triturated with ether until crystalline.

Crude yield .25 g. 70% M.P. 105–140.

After several recrystallizations from isopropyl alcohol the melting point was 167–168. No M.P. depression with compound obtained in Reaction Path II.

REACTION PATH II

Alternate route leading to the synthesis of I (No. on Flow Sheet) 3(4-dimethylaminobut-2-yl)pseudo-1,2,3,4-oxatriazol-5-one 17.4 g. (6.1 m.) of the semicarbazone was disolved in 30 cc. of concentrated hydrochloric acid and 100 cc. of methanol and reduced with hydrogen at 46 p.s.i. using platinum oxide as a catalyst. The theoretical amount of hydrogen was taken up in 16 hrs. using a low pressure Parr-Bomb shaker. The reaction mixture was filtered separating the catalyst and the filtrate was cooled to 0° C. While vigorously stirring the reaction mixture, 10 g. (0.14 m.) of sodium nitrite, dissolved in 20 cc. of water, was added slowly maintaining the temperature between 0–5° C. At the end of the addition the reaction mixture was placed in a 60° C. water bath. When the gases ceased to evolve from the reaction mixture the clear solution was cooled and neutralized with a 10% sodium hydroxide solution. The solution was evaporated to dryness in vacuo and the solid residue was extracted with hot isopropyl alcohol. The combined isopropyl alcohol extracts were evaporated to dryness in vacuo and the viscous residue was treated with ethanolic hydrochloric acid and then ether precipitating the title compound. After several recrystallizations from isopropyl alcohol, the yield was 6 g. M.P. 167–168.

Analysis.—Calculated $C_7H_{15}N_4OCl$: C, 37.76; H, 6.78; N, 25.16. Found: C, 37.83; H, 6.87; N, 25.03.

EXAMPLE IV 3-(1-methylpiperid-4-yl)-pseudo-1,2,3,4-oxatriazol-5-one (a) Semicarbazone of 1-methyl-4-piperidone.—To 96.0 g. (0.863 mole) of semicarbazide hydrochloride in 450 ml. of water was added 130 g. (0.957 mole) of sodium acetate. To the resulting solution 89.0 g. (0.787 mole) of 1-methyl-4-piperidone was slowly added with stirring. The mixture was then stirred at 40° for 1½ hours and at room temperature for 2 hours. Three hundred grams of potassium carbonate was added causing the product to crystallize immediately. The mixture was cooled to 10°, with stirring, and then filtered. The product was washed with a small amount of iced-water and dried in an oven at 85°. After one recrystallization from absolute ethanol, the semicarbazone melted at 181–183° (McElvain and Rorig, J. Am. Chem. Soc., 70, 1820 (1948) reported M.P. 182–184°); yield 70.0 g. (52%).

(b) 3-(1-methylpiperid-4-yl)-pseudo - 1,2,3,4 - oxatriazol-5-one

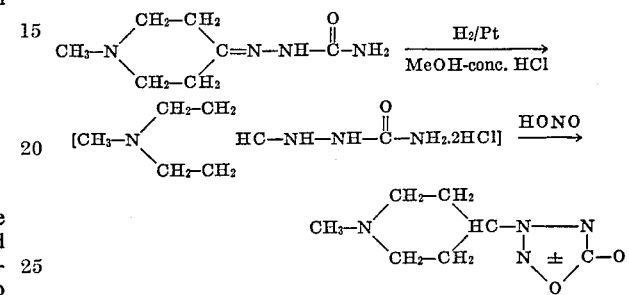

To a cooled mixture of 17.0 g. (0.1 mole) of 1-methyl-4-piperidone semicarbazone in 100 ml. of methanol was added 17.2 ml. (0.2 mole of HCl) of concentrated hydrochloric acid. Platinum oxide (0.2 g.) was added to the solution of the semicarbazone and the mixture was then subjected to hydrogenation in a Parr low pressure hydrogenator (initial hydrogen pressure, 60 p.s.i.g., i.e., pounds per square inch gage pressure). Seventy-five percent of the semicarbazone was hydrogenated within the first hour. However, a period of 20 hours was required to drive the reaction to completion. The catalyst was filtered off and the solvent removed from the filtrate under reduced pressure. The remaining oily residue was dissolved in 40 ml. of water and the solution placed in a 1 liter 3-necked flask equipped with a stirrer and a thermometer. The solution was cooled and 34 ml. of concentrated hydrochloric acid was added. The resulting solution was cooled to −5° in a salt-ice bath and, with vigorous stirring, 167 ml. of a 10% aqueous solution of sodium nitrite was added dropwise while maintaining the temperature at −5° to 0°. After the addition was completed, the mixture was stirred an additional hour at −5°. The solution was then brought to 55–60° and kept there for one hour with stirring. The resulting reaction mixture was then evaporated to dryness at 50° and at reduced pressure. The remaining solid residue was triturated with 100 ml. of isopropanol and filtered. The dried salt weighed 32.0 g. The salt was dissolved in 120 ml. of water and the solution treated with 100 ml. of a saturated solution of potassium carbonate. The solid that separated was filtered and dried in vacuum over $P_2O_5$. The dried product was then digested with 85 ml. of hot n-butanol and the inorganic salts filtered off. The filtrate on cooling yielded 11.0 g. (60%) of the product as colorless crystals, M.P. 121–123°. After two additional recrystallizations from n-butanol the pseudo-oxatriazole melted at 122–123.5°.

Calculated for $C_7H_{12}N_4O_2$: C, 45.64; H, 6.57; N, 30.42. Found: C, 45.52; H, 6.60; N, 30.36.

EXAMPLE V 3-(3-tropanyl)-pseudo-1,2,3,4-oxatriazol-5-one (a) Semicarbazone of tropinone.—To 67.0 g. (0.60 mole) of semicarbazide hydrochloride in 330 ml. of water was added 91.0 g. (0.67 mole) of sodium acetate. To the resulting solution 76.4 g. (0.55 mole) of tropinone was added with stirring. The reaction mixture was then stirred at 50–60° for 2 hours. After the reaction mixture had cooled to room temperature, 210 g. of potassium carbonate was added with stirring, causing the product to crystallize. Stirring was continued for one-half hour and then the semicarbazone was filtered and dried in vacuum over P₂O₅. The dried product weighed 139 g. above theory, (mostly inorganic salts). The crude semicarbazone melted at 205° (dec.), the literature reports melting points varying from 212–258°. The above crude semicarbazone was used in the subsequent step.

(b) 3-(3-tropanyl)-pseudo-1,2,3,4-oxatriazol-5-one

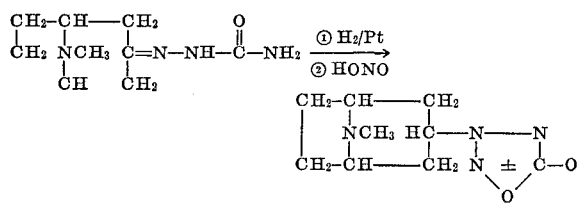

The crude tropinone semicarbazone (113.7 g., approx. 0.4 mole) obtained in part (a) was added to 400 ml. of methanol. While maintaining the temperature at approximately 25°, 118 ml. (1.2 mole) of concentrated hydrochloric acid was added with stirring. The resulting mixture was then filtered, thus removing most of the inorganic salts that were present in the crude semicarbazone. Platinum oxide (0.8 g.) was added to the filtrate and the mixture was then subjected to hydrogenation in a Parr low pressure hydrogenator (initial hydrogen pressure, 60 p.s.i.g.). After 20 hours, the catalyst was filtered off and the solvent removed from the filtrate under reduced pressure. The solid residue was dissolved in 200 ml. of water and the solution placed in a 3-necked 3 l. flask equipped with a stirrer and a thermometer. The solution was cooled and 136 ml. of concentrated hydrochloric acid was added. The solution was now cooled to −5° in a salt-ice bath and, with vigorous stirring, 670 ml. of a 10% aqueous solution of sodium nitrite was added dropwise while maintaining the temperature at −5° to 0°. After the addition was completed, the mixture was stirred an additional hour at 0°. During this period a yellow solid had separated. The mixture was then brought to 60° and kept there for one hour with stirring. The solid gradually dissolved during the heating period. The reaction mixture was then evaporated to dryness at 50° and at reduced pressure. Approximately 200 ml. of ethanol was added to the wet crystalline mass and the mixture again evaporated to dryness. The treatment with ethanol was repeated a second time. The remaining crystalline residue was then triturated with 200 ml. of isopropanol and filtered. The dried salt, weighing 153.1 g., was dissolved in a minimum amount of water and then 500 ml. of a saturated solution of potassium carbonate was added. The resulting mixture was extracted with three portions of ether, and the combined ether extracts dried over anhydrous magnesium sulfate. The dried ethereal solution was evaporated to dryness under reduced pressure yielding, 72.7 g. of a solid yellow residue. This residue was dissolved in 240 ml. of hot isopropyl ether and the solution allowed to cool. Crystals formed almost immediately but there was a tendency of some oiling as the solution cooled. To prevent oiling small portions of diethyl ether were added, with a final total of 60 ml. The light yellow crystals weighed 41.0 g., M.P. 67.5–69.5° The crystals were dissolved in 235 ml. of hot isopropyl ether, the solution treated with charcoal, filtered and the filtrate allowed to cool. Yield of colorless crystals 34.0 g., M.P. 69–70°. A third recrystallization from 150 ml. of hot isopropyl ether yielded 29.0 g. (35%) of the title pseudo-oxatriazole as colorless crystals, M.P. 69–70°.

Calculated for C₉H₁₄N₄O₂: C, 51.42; H, 6.71; N, 26.65. Found: C, 51.54; H, 6.84; N, 27.51.

EXAMPLE VI 3-(1-methyl-2-phenylethyl)-1,2,3,4-pseudo-oxatriazol-5-one

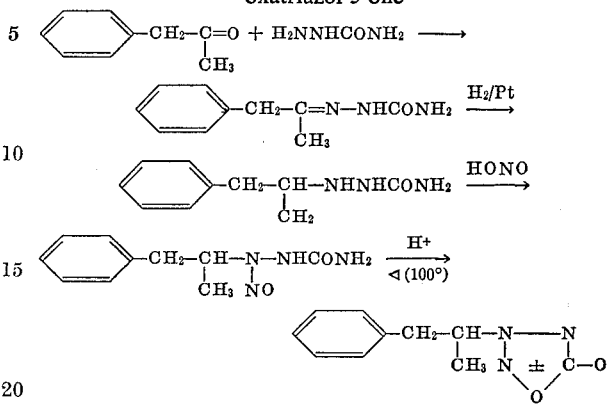

I: 3-phenylpropanone semicarbazone 134.5 gm. 3-phenylpropanone (1 mole) was dissolved in 200 ml. ethanol.
125 gm. semicarbazide hydrochloride and
100 gm. 100% sodium acetate was dissolved in
850 ml. water. When solution was complete, the two solutions were mixed and vigorously stirred. Reaction took place almost immediately. The reaction mixture was heated to 60° to ensure complete reaction. It was cooled, filtered and washed. Recrystallized from
1300 ml. 1:1 ethanol:isopropanol.
Yield=152.5 gm.
M.P.=190–191°

II: 1-(1-methyl-2-phenylethyl)-semicarbazide 60 gm. 3-phenylpropanone semicarbazone (0.31 mole) was dissolved in
220 ml. glacial acetic acid. Added
800 mg. PtO₂ and hydrogenated at 60 p.s.i.g., starting pressure in Parr apparatus. Absorbed 41½ p.s.i.g. in 12 hours, 36 p.s.i.g. in first 4 hours. Filtered off catalyst, removed acetic acid, added
250 ml. water, neutralized with potassium carbonate, filtered and washed with water. Recrystallized from about
800 ml. ethyl acetate.
Yield—52 gm.
M.P. 130–131° corrected III. 1-(1-methyl-2-phenylethyl)-1-nitrososemicarbazide 58 gm. (0.3 mole) 1-(1-methyl-2-phenylethyl)-semicarbazide was dissolved in
500 ml. water and
100 ml. conc. hydrochloric acid. Cooled to 0°. Material reprecipitated. Added
25 gm. NaNO₂ in 300 ml. solution as quickly as it was taken up. Stirred with slight excess of HNO₂ for ½ hour. Filtered and washed with water. Reslurried in
500 ml. distilled water. Filtered and washed with
2 × 250 ml. water. Dried in vacuo over P₂O₅
Yield—59 gm.
M.P.—122–123°
May be recrystallized from isopropanol (5 ml./1 gm.)

IV: 3-(1-methyl-2-phenylethyl)-1,2,3,4-pseudo-oxatriazol-5-one 20 gm. (0.09 mole) 1-(1-methyl-2-phenylethyl)-1-nitrososemicarbazide and
200 ml. 10% aqueous hydrochloric acid were stirred at reflux for ½ hour, cooled, and extracted successively with
100, 25 and 25 ml. of CHCl₃. The combined CHCl₃ was washed twice with
100 ml. saturated sodium bicarbonate and was dried over MgSO₄. The solvent was removed and the residue distilled in vacuo. Distilled very rapidly at 164° at 0.05 mm.
Redistilled.
Fraction I 128–144° at 0.05 mm. wgt.-1.5 g. $N_D^{25}$—1.5270
Fraction II 144–134° at 0.10–0.05 mm. Wgt.-10.3 g. $N_D^{25}$—1.5310
Fraction III 134–128° at 0.05 mm. Wgt.-0.8 g. $N_D^{25}$—1.5352

A series of tests showed that ring closure could be attained by refluxing the nitroso compound in inert solvents, with or without acetic acid. Without acetic acid high temperatures (generally above the M.P. of the nitroso compound) were necessary. Results shown below.

I—Six hours at 100° (n-$C_4H_9Br$)—about 50% conversion.
II—Six hours at 120° ($C_2H_2Cl_4$)—50–75% conversion.
III—One and one-half hours at 132° ($C_2H_4Br_2$)—about 100% conversion, some decomposition.
IV—Three-quarter hour at 143° ($BrCH_2CH_2CH_2Cl$)—about 100% conversion, some decomposition.
V—One-half hour at 100° in 10% aqueous hydrochloric acid—about 100% conversion.
VI—Three hours at 100° (n-$C_4H_9Br$) with 3 mole equivalents of acetic acid—100% conversion, no apparent decomposition.
VII—Three hours at 120° ($C_2H_2Cl_4$) with 3 molecular equivalents of acetic acid—100% conversion.
VIII—Three-quarter hour at 132° ($C_2H_4Br_2$) with 3 equivalents acetic acid—100% conversion, some decomposition.
IX—Three-quarter hour at 143° (Br($CH_2$)$_3$Cl) with 3 equivalents of acetic acid—100% conversion, some decomposition.
X—Six hours at 25° (Br($CH_2$)$_3$Cl)+3 equivalents acetic acid—30–50% conversion, no decomposition apparent.
XI—Dry heat at 160°—100% conversion with much decomposition (probably about 75%). Ammonia was evolved in all the above cases in which acid was absent.

EXAMPLE VII 3-(1,3-dimethylbutyl)-1,2,3,4-pseudo-oxatriazol-5-one

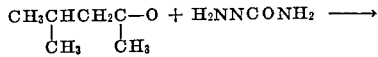

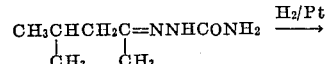

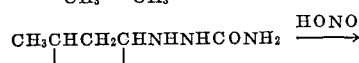

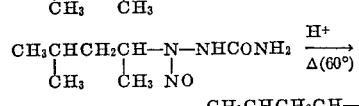

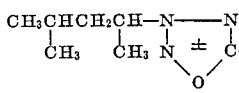

I: 4-Methyl-2-pentanone semicarbazone 100 gm. 4-methyl-2-pentanone (1 mole) was dissolved in
200 ml. ethanol
125 gm. semicarbazide hydrochloride and
100 gm. sodium acetate (anhydrous) was dissolved in 850 ml. water. When solution was complete the ketone solution was added and the mixture swirled vigorously. Heated to 60° to dissolve product, which crystallized out on cooling. Filtered and washed with water
Yield—130 gm.
M.P.—131–133°

Attempted recrystallization of a small amount of material from water caused decomposition. Therefore the above product was used without further purification.

II: 1-(1,3-dimethylbutyl)-semicarbazide 128 gm. 4-methyl-2-pentanone semicarbazone (0.82 mole) was dissolved in
600 ml. acetic acid. Added
2.40 gm. $PtO_2$ and hydrogenated at 60 p.s.i.g. starting pressure in two Parr hydrogenators of small (500 ml.) capacity. Hydrogen uptake was 69 p.s.i.g. in 3½ hours (theoretical uptake was 67 p.s.i.g.). Filtered off catalyst, removed acetic acid and added
1000 ml. water, neutralized with potassium carbonate, filtered and washed with water. Recrystallized from
2500 ml. water, then from
500 ml. ethanol. Yield—75 gm. M.P.—150.5–151.5°

*Analysis.*—Calcd. for $C_7H_{17}N_3O$: C, 52.80; H, 10.76; N, 26.39. Found: C, 53.11; H, 10.77; N, 26.60.

III: 1-(1,3-dimethylbutyl)-1-nitrososemicarbazide 15 gm. 1-(1,3-dimethylbutyl)-semicarbazide was dissolved in
300 ml. water and
20 ml. hydrochloric acid. Cooled to —5° and added
6.7 gm. sodium nitrite in 50 ml. solution over ½ hour (as quickly as it was taken up). Stirred for ½ hour with excess $HNO_2$. Filtered and washed with water. Reslurried in
50 ml. water. Filtered and reslurried in
50 ml. water. Filtered and washed with water. Dried in vacuo over $P_2O_5$. Yield—12 gm. M.P.—108–109°. May be recrystallized from benzene (0.22 gm./ml.)

*Analysis.*—Calcd. for $C_7H_{16}N_4O_2$: C, 44.66; H, 8.57; N, 29.77. Found: C, 44.81; H, 8.61; N, 29.47.

IV: 3-(1,3-dimethylbutyl)-1,2,3,4-pseudo-oxatriazol-5-one 4 gm. 1-(1,3-dimethylbutyl)-1-nitrososemicarbazide and 40 ml. 10% hydrochloric acid was heated with vigorous stirring at 60° for ½ hour, cooled and extracted with 40 ml. chloroform. Washed chloroform solution twice with 30 ml. sodium bicarbonate solution. Dried the $CHCl_3$ solution over Mg $SO_4$. Removed chloroform. Slight cloudiness present in liquid; therefore, a little Celite was added and the suspension was filtered. A clear colorless liquid was obtained. Crude weight=3.1 gm. Product had U.V. Absorption maxima at 263 mu. Fractionated in vacuo. Fraction I up to 85° at 0.03 mm. Fraction II 86–88° at 0.03 mm. Wgt.=1.3 g. $N_D^{25}$=1.4579. Fraction III 86–88° at 0.03 mm. Wgt.=1 g. $N_D^{25}$=1.4580.

*Analysis.*—Calcd. for $C_7H_{13}N_3O_2$: C, 49.11; H, 7.65; N, 24.55; Found: C, 49.42; H, 7.83; N, 24.65.

EXAMPLE VIII 3-cyclododecanyl-pseudo-1,2,3,4-oxatriazol-5-one

The four step synthesis of the title compound starting from cyclododecanone is given below.

I: Semicarbazone of cyclododecanone

Forty-six gm. (0.26 m.) of cyclododecanone was dissolved in 225 cc. of ethyl alcohol. Water was then added until the solution was faintly turbid and the turbidity was then removed with a few drops of alcohol. Then 50 g. (0.44 m.) of semicarbazide hydrochloride and 60 g. (0.73 m.) of sodium acetate was added and the mixture was stirred vigorously for 15 minutes. The reaction mixture was then placed in a hot water bath (75° C.) and stirred for additional 15 minutes. After cooling in an ice-bath for one-half hour, the title compound was filtered and washed with cold water.

Yield 63 g., M.P. 220–222° C. Ruzicka reports 220° C.
Reference: L. Ruzicka, et al., Helv. Chim. Acta, 9, 230–48 (1926) C.A., 20, 1792 (1926).

II: 1-cyclododecanylsemicarbazide

A slurry of cyclododecanone semicarbazone (238 g., 0.1 m.) in a mixture of 30 cc. of concentrated hydrochloric acid and 200 cc. of methanol was subjected to catalytic hydrogenation at 50 p.s.i. in the presence of 200 mg. of platinum oxide using a low-pressure Parr shaker apparatus. The theoretical uptake of hydrogen occurred in 20 hrs. The semi-solid mixture was then heated on a water-bath, after the addition of a few milliliters of water, the white solid went into solution. The catalyst was removed by filtration and the filtrate was cooled in a refrigerator. The title compound precipitated after several hours and was isolated.

Yield 19 gm. M.P. 183–187° C.

The substituted semicarbazide has also been prepared by the reduction of the semicarbazone in the presence of acetic acid and platinum oxide.

Two methods were employed for the preparation of the nitroso derivative.

III: 1-cyclododecanyl-1-nitrososemicarbazide

Method A.—1-cyclododecanylsemicarbazide (9.6 gm., 0.04 m.) was dissolved in anhydrous methyl alcohol and cooled to 0° C. Nitrous acid fumes, produced by the action of 25% sulfuric acid on sodium nitrite and subsequently swept into the reaction mixture with nitrogen, were bubbled slowly into the alcoholic solution while maintaining the temperature between 0–5° C. The nitrous acid fumes was bubbled into the solution until the precipitation of the title compound was complete. The product was filtered and washed first with cold water and then with cold methanol.

Yield 6.5 g. M.P. 155–158° C.

Method B.—In a three necked round bottomed flask equipped with an efficient stirrer was placed 24 g. (0.1 m.) of 1-cyclododecanylsemicarbazide in 100 cc. of water. Then with cooling 50 cc. of hydrochloric acid was added. After the addition the mixture was cooled to 0° C., and 20 gm. of sodium nitrite dissolved in 100 cc. of water was added dropwise while maintaining the temperature between 0–5° C. After the addition, the ice-bath was replaced with a 60° C. water bath and the mixture was stirred for an additional half hour. The nitrososemicarbazide was filtered and air dried.

Yield 27 gm. M.P. 151–154° C.

IV: 3-(cyclododecanyl)-pseudo-1,2,3,4-oxatriazol-5-one

In a 100 cc. round bottom flask equipped with an efficient stirrer 12 gm. of 1-cyclododecanyl-1-nitrososemicarbazide was refluxed with 50 cc. of 1 N hydrochloric acid for 20 hrs. Concentrated ammonium hydroxide was added slowly with external cooling until the solution was neutral. An oil (or solid) which separates was extracted several times with ether. The combined ethereal extracts was dried over magnesium sulfate and the ether removed by evaporation. The residue distilled at 162°/.1 mm. The yield of the title compound was 4.75 gms.

Analysis.—Calculated $C_{10}H_{23}N_3O$: C, 61.63; H, 9.15; N, 16.59. Found: C, 61.09; H, 9.34; N, 16.75, 16.76.

EXAMPLE IX

3-(2-ethylhexyl)-pseudo-1,2,3,4-oxatriazol-5-one

I: 1-(2-ethylhexyl)-semicarbazide

Semicarbazide hydrochloride (12.5 gm.) was dissolved in 15 ml. of hot water and converted to the free base by the addition of 10 gm. sodium acetate. This solution was added to 135 ml. glacial acetic acid. After about 30 seconds the precipitated salt was filtered off and 12.8 gm. (0.1 mole) 2-ethylhexanal was added. Platinum dioxide (200 mg.) was added to this solution, which was then hydrogenated (at 60 p.s.i.g. starting pressure) for 8 hours; 8½ p.s.i.g. was absorbed during this time.

The catalyst was filtered off, the solvent removed in vacuo, and the residue added to 1000 ml. water. The mixture was neutralized with potassium carbonate. An oil was obtained which gradually solidified. This was filtered off and dried in vacuo over phosphorus pentoxide. After two recrystallizations from hexane (2.5 ml./gm. semicarbazide) there was obtained 7.2 gm. of product melting at 74° to 75.5°.

II: 3-(2-ethylhexyl)-pseudo-1,2,3,4-oxatriazol-5-one 1-(2-ethylhexyl)-semicarbazide (58.0 gm.) was dissolved in 500 ml. of water and 100 ml. of conc. hydrochloric acid. The solution was cooled to −5° and 17 gm. of sodium nitrite in 225 ml. of water was added as rapidly as it was taken up (about 1½ hours). The tarry nitroso compound was stirred for 30 minutes with a slight excess of nitroso acid, then heated to 60° for 45 minutes. After cooling to room temperature, the mixture was extracted with chloroform. The chloroform solution was extracted with sodium bicarbonate solution and then dried over magnesium sulfate. The infrared spectrum of the solution indicated the presence of a side product along with the pseudo-1,2,3,4-oxatriazol-5-one.

If the mother liquor from the nitrosation is removed and the tarrp nitroso compound washed with distilled water at 0° and then heated in an equivalent amount of 5% hydrochloric acid, there is no side product visible in the infrared spectrum of the resulting chloroform extract.

The chloroform was removed in vacuo and the residue twice fractionated in vacuo. The fraction distilling at 122–124° at about 0.15 mm. weighed 28.2 gm. and had an $N_D^{25}=1.4645$.

Analysis. — Calculated for $C_9H_{17}N_3O_2$: C, 54.25; H, 8.60; N, 21.09. Found: C, 54.60; H, 8.79; N, 21.26.

The pseudo-oxatriazoles of this invention may be mixed with any of the well known therapeutically acceptable carriers. Suitable proportions are 5 percent pseudo-oxatriazole with 95 percent carrier to 95 percent pseudo-oxatriazole with 5 percent carrier, or, while not commercially practical, 100 percent pseudo-oxatriazole can be administered.

The composition is placed in dosage unit form such as in tablet form or in capsule. Also, suspensions may be made. The unit dose may vary from 50–500 mg. total dose. Tests on man have not yet been carried out and the above dosage amount is based on experimental work on other animals.

The following table summarizes the pharmacological findings of the pseudo-oxatriazoles indicated:

TABLE A

| Compound Number | Cardiovascular | CNS Stimulation | Therapeutic Indication |
| --- | --- | --- | --- |
| S510–10 | Cat; increased at 25 i.p. decreased 28% at 10 p.o. | Present (clonic convulsions at 20, p.o.). | CNS-stimulant (anti-depressant, analeptic). |
|  | Dog; no effect. |  |  |
| S491–12 | Dog; reduced 26 to 55% for 1 to 60 min. (diastolic) 5–80 mg./kg. | Present CD50 approx. 140 mg./kg. | CNS-stimulant (antidepressant, analeptic) and anti-hypertensive Blood pressure dec. 60% within 50 sec. Lasted over 3½ hr. at this time BP was 15% below pre-dose level. No effect on nictitating membrane. No effect on BP of the rat. |
|  | Inactive in the rat. |  |  |
| S491–13 | Transient lowering (6 min. 30%) Arter 1–10 mg./kg., i.v. | Questionable |  |

TABLE A—Continued

| Compound Number | Cardiovascular | CNS Stimulation | Therapeutic Indication |
|---|---|---|---|
| S480–143 | Rat; unaffected 100 mg./kg., p.o. Dog; 25–30% decrease at 50 mg./kg. for 4½ hours. | | Hypertension. |
| S510–11 | No effect at 2.5 to 40 mg./kg., i.v. (dog). | | |
| S613–5 | Dog; decrease of 25–35% for 1–2 hours at 5 to 20 mg./kg. i.v. (dog). | | Hypertension. |
| S613–21 | BP 70–100% increased over control briefly, then falling to 10–70% increase over control for 30 minutes at 10–50 mg./kg. i.v. (dog). | | |
| S615–15 | 20–30% at 10–25 mg./kg., i.v. for 1–2 hours (dog). | | |
| S615–16 | BP 40–50% for over 3 hours at 10–50 mg./kg., i.v. (dog). | | Hypertension. |
| S616–26 | Transient vasodepressor activity at 20–50 mg./kg., i.v. (dog). | | |
| S615–28 | BP 25% for 6 hours at 50 mg./kg., p.o. (dog). | | Hypertension. |
| S616–35 | | | |

Compounds S510–10 and S491–12 were immediately absorbed from the GI Tract. Absorption tests on the others were not made in these experiments.

Referring to the above numbers, the structures of the compounds are as follows:

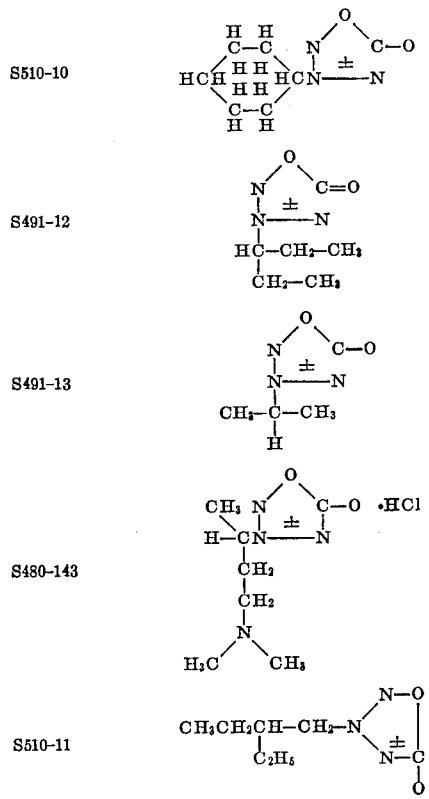

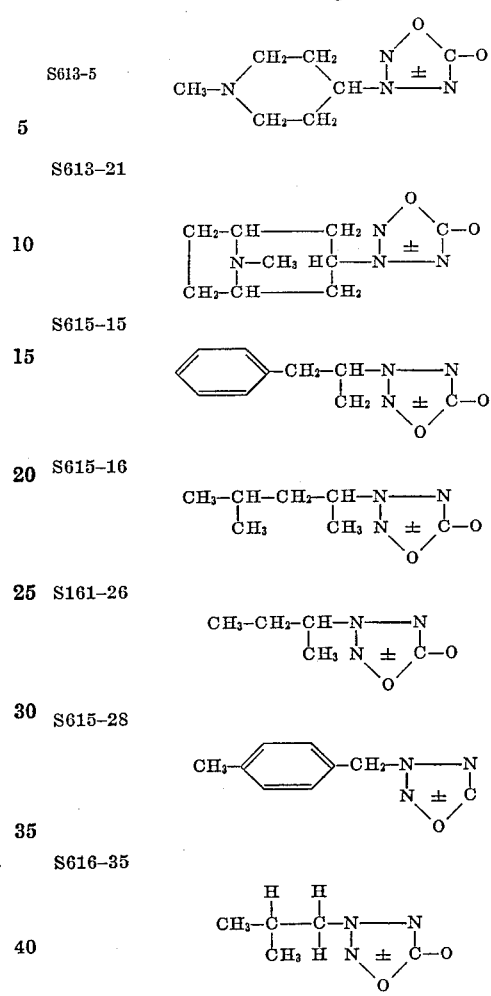

We claim:
1. A compound having the formula:

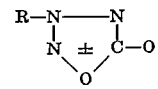

where R is a phenyl substituted loweralkyl, piperidyl, methylpiperidyl, tropanyl, dimethylaminobuty or pseudo-oxatriazoletetramethylene.

2. The compound of claim 1 wherein R is piperidyl.
3. The compound of claim 1 where R is methyl-piperidyl.
4. The compound of claim 1 where R is tropanyl.
5. The compound of claim 1 wherein R is pseudo-oxatriazoletetramethylene.
6. The compound of claim 1 wherein R is dimethylaminobutyl.
7. The compound of claim 1 where R is benzyl.
8. The compound of claim 1 where R is phenylethyl.
9. The compound of claim 1 where R is phenylpropyl.
10. The compound of claim 1 where R is alphamethylphenylethyl.

References Cited

Wiley: The Chemistry of Heterocyclic Compounds, Interscience, pp. 323–324, (1962) QD 401 F–58.

HENRY R. JILES, *Primary Examiner.*

ALAN L. ROTMAN, *Assistant Examiner.*

U.S. Cl. X.R.

260—294, 294.7, 295, 307; 424—263, 267, 272